Aug. 7, 1951   J. P. O'HAGAN   2,563,483
RESERVOIR TUBING CUTTER
Filed Jan. 12, 1950   2 Sheets-Sheet 1

INVENTOR
JOHN PATRICK O'HAGAN
by Hooper, Leonard & Glenn
his attorneys

Aug. 7, 1951   J. P. O'HAGAN   2,563,483
RESERVOIR TUBING CUTTER
Filed Jan. 12, 1950   2 Sheets-Sheet 2
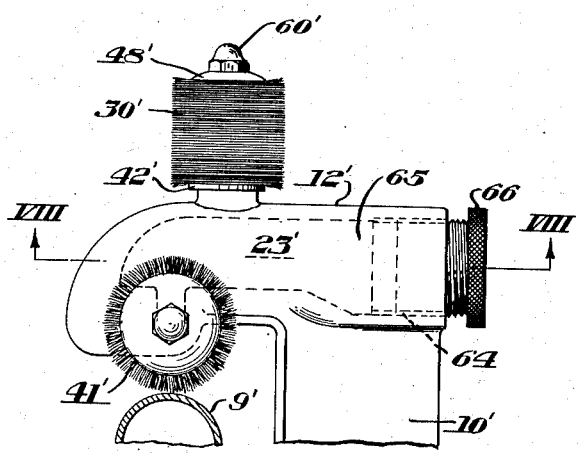
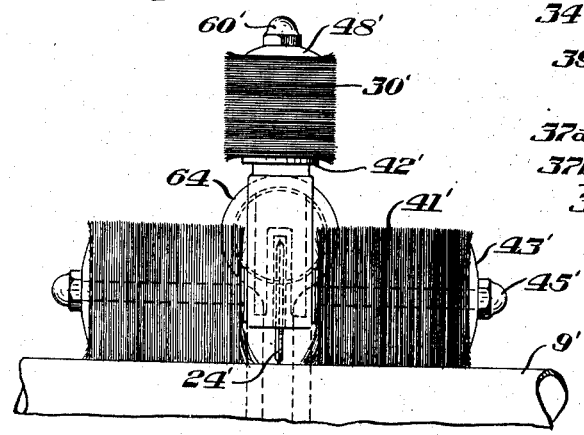
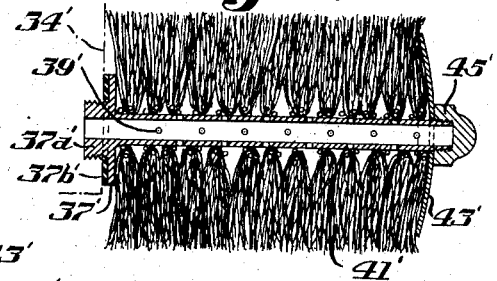
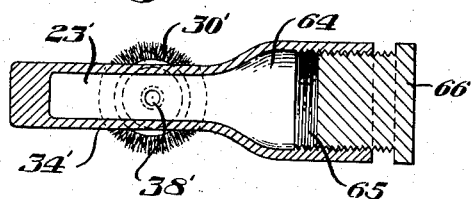
INVENTOR
JOHN PATRICK O'HAGAN Patented Aug. 7, 1951

2,563,483

UNITED STATES PATENT OFFICE 2,563,483

RESERVOIR TUBING CUTTER

John Patrick O'Hagan, Pittsburgh, Pa.

Application January 12, 1950, Serial No. 138,203

9 Claims. (Cl. 30—123)

This invention relates to a novel reservoir tubing cutter for cylindrical tubing or pipe. More particularly, it relates to such a cutter which during the act of cutting also performs other preparatory acts required, for example, in anticipation of the making of a soldered joint with said tubing.

In the operation of making a soldered joint with tubing such as the copper or brass tubing used in plumbing, it is usual to cut one or more lengths of tubing to the required dimensions and prepare the respective joint or joints for assemblage with a fitting such as a T or other fitting. The joint is then soldered together and made ready for use. This procedure commonly involves a number of steps performed successively with a consequent loss of time and increase in cost. For example, a selected length of tubing may be cleaned where the cutting for the joint is to be made; then cut with an ordinary tubing cutter; then filed or scraped to remove any external burr; and then separately coated with a soldering flux for the appropriate distance on each side of the cut. If the cutting wheel is not sufficiently sharp or the operator is inexperienced, an internal burr may be produced which also has to be removed. This is usually done by means of a triangular scraper or a fluted hand reamer after which a small brush may be used to remove particles from the inside of the tubing. The fitting is usually then interiorly fluxed and assembled over the fluxed portions of the tubing next to the cut, the joint is heated and solder applied at the edge of the fitting and surface of the tubing, the solder is drawn by capillary action into the space between tubing and fitting to complete what may be referred to as a sweated joint.

The foregoing operations performed on the exterior of the tubing adjacent the cut have heretofore been wholly separate and distinct and have involved the use of a number of separate tools. In the new reservoir tubing cutter of this invention a plurality of these different steps are mutually performed at the time that the act of cutting is performed. This new device with its evident advantages is illustrated in the accompanying drawings, in which, Figure 1 is a front view of a preferred embodiment of the reservoir tubing cutter of this invention suitable for use with a liquid flux;

Figure 5 is a front view of the head of a modified device, including the brush assembly made in accordance with this invention and suitable for use with a pasty flux;

Figure 6 is a side view of the modification shown in Figure 5;

Figure 7 is an enlarged view in cross section taken longitudinally through one part of the brush assembly shown in Figure 5; and Figure 8 is a view in cross section taken along line VIII—VIII of Figure 6.

Figure 1:
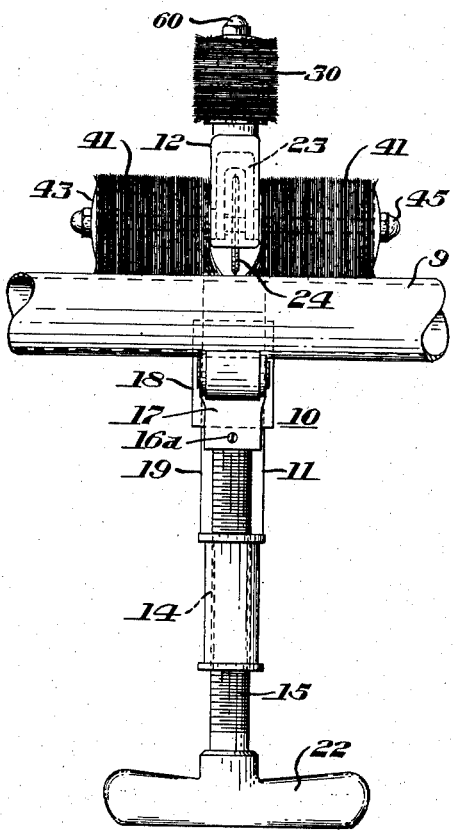
Figure 2:
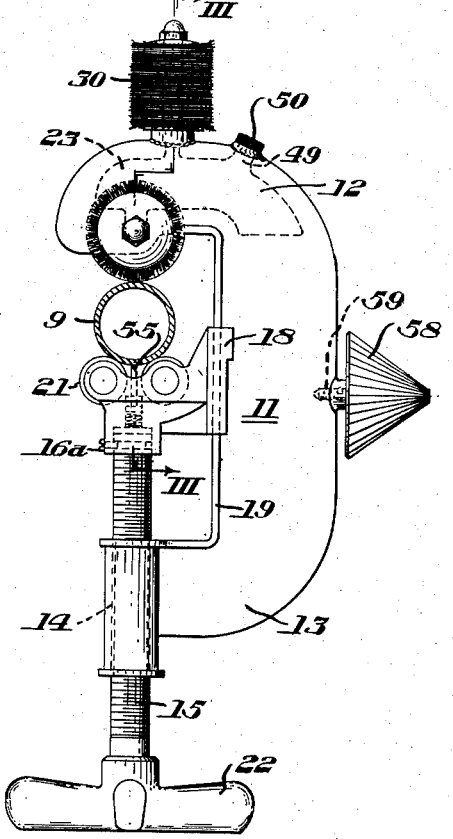
Figure 2 is a side view of the device shown in Figure 1.

Referring to Figures 1 and 2, a piece of tubing 9 is shown in a reservoir tubing cutter 10 which comprises a frame 11 generally in the shape of the letter C having a head 12 and a foot 13. A drilled and tapped opening 14 integral with foot 13 engages the threads of a screw rod 15, the inner end 16 of which bears against a roll carriage 17 having a grooved base 18 which is adapted to slide along ways 19. A cylindrically-nosed set-screw 16a engages a groove 16b in end 16 to hold carriage 17 thereto while permitting rod 15 to rotate. These ways 19 are on opposite sides of frame 11 and are usually integral therewith. Roll carriage 17 has a cylindrical recess 20 therein in alignment with the axis of screw rod 15 and a rectangular broached opening 20a extending between recess 20 and the top of carriage 17 between a pair of cradling rolls 21 mounted in carriage 17 in a conventional manner with the surfaces thereof parallel to the front and back sides of broached opening 20a.

A metal washer 51 closes the lower end of recess 20 and is held in place by the extreme upper end 16 of screw rod 15. A helical spring 52 bears on the upper side of washer 51 and against the lower side of a cylindrical head 53 of a burring tool 54. Burring tool 54 is rectangular in cross section along the body thereof integral with cylindrical head 53 which fits recess 20. Burring tool 54 is provided with a chisel edge 55 to remove any external burr made in the course of a cutting operation by cutter 10. The body of tool 54 slidably fits the rectangular broached opening 20a so it cannot drop out whenever there is no tubing clamped in cutter 10. Burring tool 54, instead of being provided with a scraping chisel edge 55, may be provided with a flat surface of some suitable abrasive such as silicon carbide generally parallel to and in abrading or cleaning surface contact with the exterior surface of any tubing being cut by cutter 10.

Since the tool 54 spans the cut, it will remove any such burr and, in addition, clean the exterior surface of the tubing on both sides of said cut under the pressure of spring 52. The pressure exerted by tool 54 against the tube can be changed by correspondingly changing the strength of the spring 52 that is used. A handle 22 at the outer end of screw rod 15 adjusts the position of roll carriage 17 along frame 11 to clamp tubing in and unclamp it from cutter 10, and further, transmits the necessary pressure to carriage 17 during cutting.

Head 12 is provided with a flux reservoir 23 bifurcated at the outer end thereof between the sides of which a conventional cutting wheel 24 is mounted on a bearing screw 25. Screw 25 has a hexagonal head 26 slotted like the head of a sheet metal screw and a threaded end portion 27 which is threaded into an appropriately drilled and closely sized opening 28 in one of the opposed walls 29 of reservoir 23. A waterproof washer may be placed under head 26 and sealing compound used on portion 27 if required to make the joint liquidproof. On the opposed outer walls 34 of head 12 in the region of reservoir 23 are tapped openings 35 of sufficient size dimension to apply and withdraw screw 25 if any replacement of or other service to cutting wheel 24 is required.

A pair of hollow perforated feeder rods 36 have an annular flange 37 formed on the inner end of each thereof adjacent to a threaded portion 37a which fits either opening 35. A washer 37b between flange 37 and wall 34 make a liquid-tight joint at that point. A plurality of indentations may be provided on the outer side of flange 37 as a grip for a prong wrench to be used when feeder tubes 36 have to be installed or removed. It will be seen, therefore, that a liquid flux in reservoir 23 is in direct communication with a series of axial and circumferential perforations 39 in the feeder rods 36. A felted sleeve or cylinder 40 of a suitable animal, vegetable or synthetic fibre closely surrounds rod 36 and acts as a wick in order to prevent any too free flow of the liquid soldering fluxes through perforations 39.

A brush 41 in turn closely surrounds fibrous sleeve 40 so as to bring the portion of the bristles of the brush next to sleeve 40 into direct or indirect contact therewith whereby the flux is transmitted to the outer ends of those bristles. Brush 41 may be constructed of twisted metal wires in helical arrangement with the bristles appropriately tufted between the wires and with a longitudinal central opening therein of sufficient diameter to slip over sleeve 40. The bristles are tufted between the twisted wires in a manner well known to those in the brush art. Brush 41 is usually cylindrical in character and since feeder rods 36 are concentric with shaft 27, the making of the diameter of brush 41 approximately that of cutting wheel 24 will insure that the external surface of a length of tubing 9 being cut by wheel 24 will have applied thereto for a predetermined distance on each side of said cut a coating of the flux which is in reservoir 23.

Figures 3, 4:
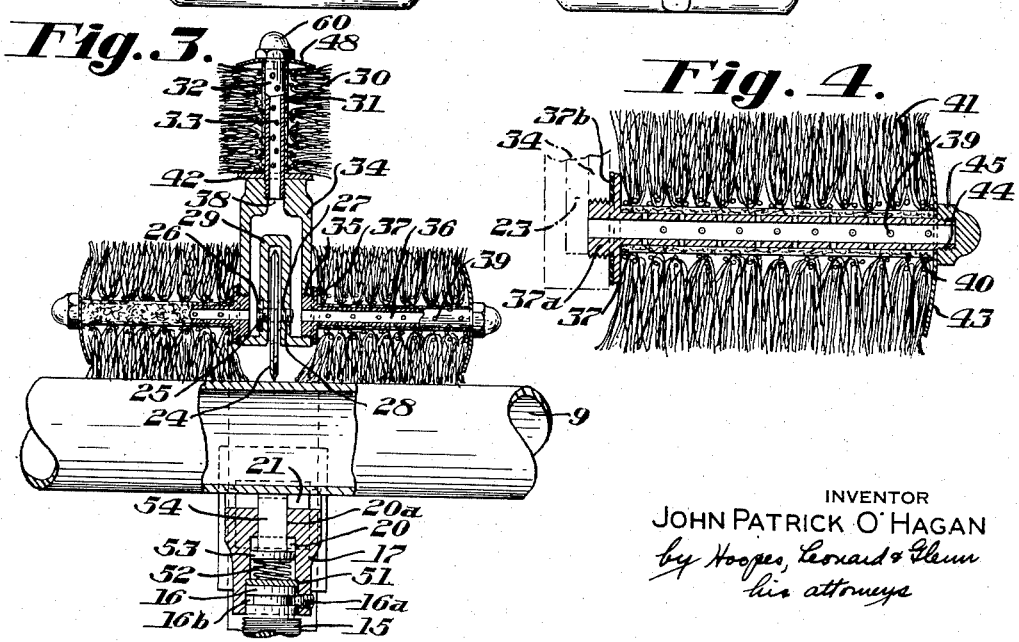
Figure 3 is an enlarged view in cross section of a part of the device shown in Figures 1 and 2 with the cross section being taken along line III—III of Figure 2.
Figure 4 is an enlarged view in cross section taken longitudinally through one part of the brush assembly shown in Figure 1.

A compacting washer 43 of dished shape has a central opening which fits over rod 36. The outer end 44 of each rod 36 is threaded for engagement with a cap nut 45 in the top of which there may be a gasket disc to liquid seal the outer end of each rod 36. The use of washer 43, as shown in Figure 3, compacts the respective brush 41 and thereby achieves some regulation of the flow of flux along the bristles of the brush depending upon the extent of such compacting, and produces a tendency for the innermost bristles of brush 41 to move into close proximity to the cutting plane of cutting wheel 24. Additional adjustment may be obtained by inserting annular spacing washers of suitable thickness between nut 45 and washer 43. It may be advantageous sometimes for this reason to make the innermost bristles somewhat longer than the remaining bristles.

Reservoir 23 is provided with a filling opening 49 having a liquidtight screw cap closure 50. If the flux to be used is corrosive, reservoir 23 may be lined with a corrosion-resistant plastic or other material and the exterior of frame 11 and the other parts of tubing cutter 10 may be plated or otherwise treated if desired to avoid any such corrosion. Thus, feeder rods 36 and washers 43 may be made of "Monel" metal and the balance of the cutter protectively plated.

For the purpose of fluxing the interior of the fittings to be used in making a soldered or sweated joint, and also for the purpose of brushing out the inside of tubing adjacent a cut made by cutter 10, cutter 10 may also be provided with a further brush 30 on top thereof similar in character to the brushes 41 but of appropriately smaller dimension. Brush 30 surrounds a fibrous cylindrical sleeve wick 31 which in turn fits around a top feed tube 32 having perforations 33 therein. The lower end of tube 32 threadably engages a tapped opening 38 affording a passage between reservoir 23 and the top exterior of head 12. Brush 30 is adjustably clamped between washer 42 and a compacting washer 48 held in place by a cap screw 60 on the threaded upper end of feed tube 32. Brush 30, sleeve 31, feed tube 32, and washer 48, function in a manner corresponding to the functioning of the brush assemblies which include the brushes 41. In the event that there is insufficient need for a brush for the fluxing of the fittings, feed tube 32 may be replaced by a solid spindle sealing off passage 38 thereby and enabling brush 30 to function as a dry cleaning brush.

A complete joint preparation device can be made in a single tool which will also take care of any internal burring that may be caused during the cutting operation by mounting on cutter 10 a fluted, conical, burring reamer 58. This burring reamer is internally tapped and threaded on the outer end of a stud 59, the inner threaded end of which engages a tapped hole in back of frame 11. Normally, the threads at each end of stud 59 will be right-handed so the reamer will work with a right-hand twist without unscrewing itself from frame 11.

The modified head of the device shown in Figures 5 to 8 corresponds to the head of the device shown in Figures 1 to 4 inclusive with certain exceptions to facilitate the use with this invention of a paste type of soldering flux. Where the parts in the modification correspond generally in construction and purpose to parts in the preferred embodiment of this invention they are given the same reference numerals, primed. Thus, as illustrated in Figure 5, a brush 41' closely surrounds the feeder rods 36' without, however, any interposition of a felted fibrous sleeve between the bristles and perforations 39'. A further change is made in the modified form of the device of this invention because of the viscous nature of the soldering flux adapted for use therein. Thus, in the modification, head 12' is provided with a considerably enlarged cylindrical section 64 in reservoir 23' adjacent an internally threaded filler inlet 65. A pressure plug 66 engages the threaded portion of inlet 65 and by means of the relative dimensions thereof will exert pressure on the flux when reservoir 23' is filled whenever plug 66 is turned by hand so as to move into the enlarged section 64 thereby reducing the overall volume in reservoir 23'. If desired, pressure plug 66 may be hollowed and provided with a helical spring and plunger in the interior thereof if it is desired to maintain some appropriate pressure on the flux in reservoir 23' at all times. By so moving plug 66, paste flux will be forced out through the perforations 39' in the feed rods 36' and out through perforations 33' in feed tube 32' so as to respectively cause the bristles of the brushes 41' and 30' to take up flux in such manner that it will be wiped off when the brushes are respectively in contact with the tubing and fittings to be fluxed during the operation of cutter 10'. The remainder of cutter 10' is similar to and as shown for cutter 10. Reservoir 23' may be filled by means of any suitable collapsible tube or pressure gun arrangement containing the soldering paste.

It will be recognized in connection with all of the modifications of the new device of this invention that the various parts are readily removable for cleaning or replacement as may be required. Further, it is understood that the various elements of this invention may be made of different materials, shifted in location and otherwise modified without departing from the spirit of the invention or the scope of the appended claims.

I claim:

1. In a reservoir tubing cutter, in combination, a frame, a cutting wheel rotatably connected adjacent one end of said frame, cradling rolls rotatably connected adjacent the other end of said frame, said cutting wheel and rolls being in opposed relation, means for moving said cutting wheel and rolls relative to each other to clamp tubing, a reservoir in said frame to hold soldering flux, at least one rigid feeding means connected to said frame, said means opening to said reservoir and extending generally parallel to and adjacent the axis of said cutting wheel, and a generally cylindrical wiper engaging the periphery of said feeding means, the surface of said wiper extending generally as far towards said rolls as said cutting wheel, whereby in the relative rotation of said cutter to cut said tubing, soldering flux will pass along said feeding means and wiper onto said tubing.

2. In a reservoir tubing cutter having a frame supporting a cutting wheel and roller members thereon, said cutting wheel and roller members being respectively connected to spaced portions of said frame and movable relative to each other to clamp tubing, in combination, a reservoir for fluid material in said frame adjacent said cutting wheel, said reservoir having an inlet thereto and an outlet therefrom, a pressure closure engaging said inlet, means for moving said closure into said reservoir to force said material through said outlet, hollow feeder means connected to said frame and surrounding said outlet, said feeder means being perforated and extending parallel to the axis of said cutting wheel, and a substantially hollow cylindrical brush closely surrounding said feeder means, whereby in the relative rotation of said cutter to said tubing, fluid material will pass along said feeder means and brush onto said tubing while said tubing is being cut by said cutting wheel.

3. In a reservoir tubing cutter having a frame supporting a cutting wheel and roller members adapted to clamp a length of tubing to be cut between said cutting wheel and said roller members, in combination, a reservoir for fluid flux in said frame having an inlet and an outlet thereto, a hollow feeder bar connected to said frame adjacent said reservoir and extending substantially parallel to the axis of said cutting wheel on both sides of the plane thereof said feeder bar having perforations along a length thereof, at least one substantially hollow cylindrical brush surrounding each of said feeder bars and adapted to receive soldering flux through said perforations, said brush being of a sufficient diameter to engage the surface of any of said lengths of tubing during the cutting thereof, and means for maintaining said brush in assembled relation to said cutter, whereby in the relative rotation of said cutter said lengths of tubing are simultaneously fluxed by said brush.

4. In a reservoir tubing cutter having a frame supporting a cutting wheel and roller members adapted to hold a length of tubing to be cut between said cutting wheel and said roller members, in combination, a reservoir for soldering flux in said frame having an inlet and an outlet thereto, a hollow feeder bar connected to said frame adjacent said reservoir and extending substantially coincident with the axis of said cutting wheel on at least one side of the plane thereof, said feeder bar having perforations along a length thereof, at least one substantially cylindrical brush surrounding said feeder bar and adapted to receive soldering flux through said perforations, said brush being of a sufficient diameter to engage the surface of said tubing during the cutting thereof, means for maintaining said brush in assembled relation on said feeder bar, and compacting means positioned between each end of said brush and said first-mentioned means.

5. In a reservoir tubing cutter, in combination, a frame having a head and foot, a cutting wheel rotatably connected to said frame adjacent the end of said head, a reservoir for soldering flux in the head of said frame having an inlet and a pair of outlets, said outlets being respectively on opposite sides of said head, a hollow feeder rod connected to each of said outlets, said feeder rod having perforations along a length thereof, a fibrous sleeve closely surrounding each feeder rod, a cylindrical brush closely surrounding each sleeve, axially movable means for retaining said sleeves and brushes in assembled position, said axially movable means being adapted to vary the compactness of said brush, and a pair of rolls connected to said frame in opposed movable relation to said cutting wheel to cradle a piece of tubing, whereby in the relative rotation of said tubing cutter to make a cut in said tubing, the external surface of said tubing at said cut is simultaneously prepared for soldering.

6. In a reservoir tubing cutter having a frame supporting a cutting wheel and roller members adapted to hold a length of tubing to be cut between said cutting wheel and said roller members, in combination, a reservoir for soldering flux in said frame having an inlet and an outlet thereto, a perforated hollow feeder bar connected to said reservoir substantially coincident with the axis of said cutting wheel and extending on at least one side of the plane thereof, a substantially cylindrical brush supported by said feeder bar and adapted to receive soldering flux through said perforations, said brush being of a sufficient diameter to engage the surface of said tubing during the cutting thereof, means for maintaining said brush in assembled relation to said cutter, and a burring tool resiliently held by said frame in the plane of said cutting tool, said burring tool being adapted to remove any external burr produced on said tubing during cutting, whereby in the relative rotation of said tubing cutter the external surface of said tubing is prepared for soldering.

7. In a reservoir tubing cutter having a frame having a head and foot and a cutting wheel mounted adjacent the outer tip of said head, in combination, a reservoir for soldering flux in the head of said frame having an inlet and a pair of outlets, said outlets being respectively on opposite sides of said head, a perforated hollow feeder rod connected to said frame at each of said outlets, a cylindrical brush closely surrounding each feeder rod, means for retaining said brushes in assembled position, said means being axially movable and adapted to vary the compactness of said brush, burring means resiliently held by said frame in the plane of said cutting wheel, said burring means being adapted to contact and remove any external burr produced by said cutting wheel during the cutting of a piece of tubing, and a pair of rolls movably connected to said frame in opposed relation to said cutting wheel to cradle said piece of tubing, whereby in the relative rotation of said tubing cutter to make a joint in said tubing, the surface of said tubing at said joint is prepared for soldering.

8. In a reservoir tubing cutter, in combination, a frame having a head and foot, a cutting wheel mounted adjacent the end of said head, a reservoir for soldering flux in the head of said frame having an inlet and a pair of outlets, said outlets being respectively on opposite sides of said head, a perforated hollow feeder rod connected to said frame at each of said outlets, a fibrous sleeve closely surrounding each feeder rod, a cylindrical brush closely surrounding each sleeve, means for retaining said sleeves and brushes in assembled position, said means being axially movable and adapted to vary the compactness of said brush, burring means resiliently held by said frame substantially across the plane of said cutting wheel, said burring means being adapted to contact and remove any external burr produced by said cutting wheel during the cutting of a piece of tubing, and a pair of rolls movably connected to said frame in opposed relation to said cutting wheel to cradle said piece of tubing, whereby in the relative rotation of said tubing cutter to make a cut in said tubing, the surface of said tubing at said cut is prepared for soldering.

9. In a reservoir tubing cutter having a frame supporting a cutting wheel and roller members thereon, in combination, a reservoir for fluid material in said frame adjacent said cutting wheel, said reservoir having an inlet thereto and a pair of lateral outlets therefrom, a pressure closure for said inlet, said closure being movable into said reservoir to force material in said reservoir through said outlets, a perforated feeder rod connected to each side of said reservoir and extending parallel to the axis of said cutting wheel and in proximity thereto, a substantially cylindrical brush closely surrounding each of said rods, means for maintaining said brushes on said rods in assembled relation, and a burring tool resiliently held by said frame substantially in the plane of said cutting wheel, said burring tool being adapted to remove any external burr produced by said cutting wheel, whereby in the relative rotation of said tubing cutter, the surface of the tubing being cut is prepared for soldering over a predetermined distance on each side of said cut.

JOHN PATRICK O'HAGAN.

REFERENCES CITED

The following references are of record in the file of this patent:

UNITED STATES PATENTS

| Number | Name | Date |
|---|---|---|
| 438,702 | Miller | Oct. 21, 1890 |
| 575,685 | Brockett | Jan. 26, 1897 |
| 1,828,621 | Roberts | Oct. 20, 1931 |